Jan. 12, 1943.   A. J. McMASTER   2,308,469
EXPOSURE METER
Filed Oct. 15, 1938   4 Sheets-Sheet 1

Inventor:
Archie J. Mc.Master
By McLaughlin & Wallenstein
Attorneys.

Jan. 12, 1943.   A. J. McMASTER   2,308,469
EXPOSURE METER
Filed Oct. 15, 1938   4 Sheets-Sheet 2
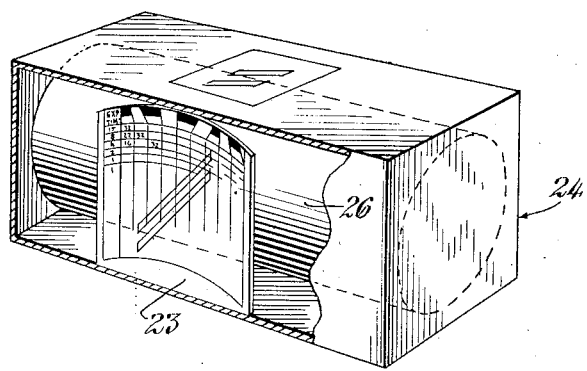
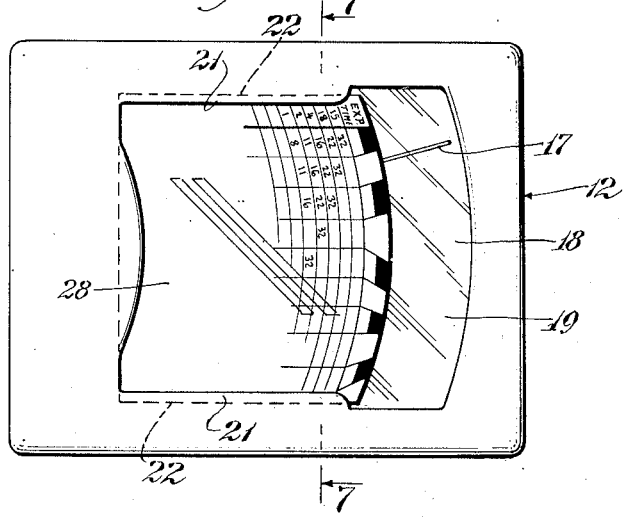
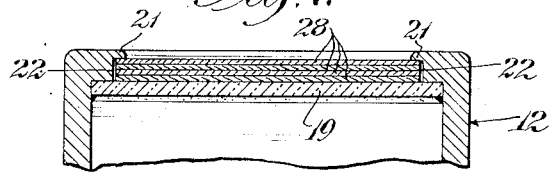
Inventor:
Archie J. McMaster
By McLaughlin & Wallenstein
Attorneys Jan. 12, 1943.  A. J. McMASTER  2,308,469
EXPOSURE METER
Filed Oct. 15, 1938  4 Sheets-Sheet 3

Inventor:
Archie J. McMaster
By McLaughlin & Wallenstein
Attorneys.

Jan. 12, 1943.  A. J. McMASTER  2,308,469
EXPOSURE METER
Filed Oct. 15, 1938  4 Sheets-Sheet 4

Inventor:
Archie J. McMaster
By McLaughlin & Wallenstein
Attorneys.

Patented Jan. 12, 1943

2,308,469

UNITED STATES PATENT OFFICE 2,308,469

EXPOSURE METER

Archie J. McMaster, Chicago, Ill., assignor to G-M Laboratories, Inc., Chicago, Ill., a corporation of Illinois Application October 15, 1938, Serial No. 235,155

7 Claims. (Cl. 88—23)

My invention relates to the art of photography and is concerned with improved and simplified means for and methods of determining the exposure to which a film should be subjected to secure the most dependable results.

In the taking of any picture photographically, there are, in general, four variables which must be considered by the photographer, namely, the intensity of the light on the subject being photographed, the lens speed (which in most cameras can be adjusted by controlling the size of the shutter opening), the duration of time that the film is exposed, and the sensitivity of the film or plate emulsion, commonly referred to as the film speed. Skilled photographers develop considerable judgment in determining these factors, but unless some reasonably accurate means be employed to coordinate the factors associated with the variables referred to above, reasonably dependable results are not obtainable in all cases, even by experts. When the relatively poorer judgment of amateur photographers is depended upon to determine shutter stops and shutter speeds under various conditions of light intensity, speed of film, and the like, results become still less dependable and a relatively large proportion of failures result, often blamed on imperfect film, improper development, or some other circumstances out of the control of the photographer.

To meet the contingencies arising from this situation, so-called exposure meters of various types have been developed over a period of a good many years. Many of these exposure meters were necessarily inaccurate because there existed no reasonably dependable mechanism for translating light values in terms capable of calibration or association with other factors. In recent years, however, because of advances in photoelectric applications, it has become possible to construct instruments in which the relative intensity of the light is directly readable on a scale with which a movable pointer is associated, and, following this principle, reasonably accurate exposure meters have been produced. Due to the necessity of associating several variables, usually at least three in addition to that relating to the light intensity, as shown by the position of a pointer, modern exposure meters have been unreasonably complicated in several respects, particularly in the arrangements of the scales employed and computing mechanism usually associated with such scales. The result is that, for the most part, only experts can be depended upon to properly utilize these exposure meters, and these are the very individuals as a rule whose judgment, because of their experience, makes it possible for them to determine with fair accuracy in a large proportion of cases the shutter and lens speed of their cameras without the use of an exposure meter at all. Those principally in need of exposure meters to secure reasonably dependable results are, in general, unable to understand and satisfactorily operate the very instruments offered to them to overcome their difficulties.

In connection with the discussion of the four variables referred to above and the coordinating of such variables with each other, there are other minor but still important factors such as background, color of the objects to be photographed, and other minor factors known to photographers which require still further compensation and adjustment, but, in general, these factors are relatively simply explained and need not be associated with scales employed with the usual exposure meters. Some exposure meter calibrating mechanisms and methods, however, have attempted to bring these subordinate factors into the calculation to correct for errors presumed to be responsible for failures obtained by photographers even when using exposure meters, when in fact such failures occur rather by virtue of complicated arrangement of exposure meters than from the fact that the subrdinate factors were not taken into consideration. The result has been that the further development and refinement of exposure meters has been in the direction of further complications rather than in the direction of simplification and it is in the direction of simplification that I have directed my investigations in the solution of the problems suggested hereinabove.

In carrying out my invention, I provide a photographic exposure meter of the photometer type, preferably utilizing the combination of a self-generating or barrier layer cell and a galvanometer, the registering needle or pointer of which will register the amount of light striking the barrier layer cell in terms of foot candles and/or arbitrarily selected divisions along its path of travel. The photometer elements are contained in a suitable housing having one window or opening for admitting light to the cell and another opening through which the needle or pointer is visible. The general construction of the photometer itself may follow the construction shown for example in Wein Patent No. 1,779,574, Tonnies Patent No. 1,982,406 and Reinhold et al. Patent No. 2,064,987.

The housing is shaped to releasably support a removable scale member having a scale, one side of which is contiguous to the path of travel of the needle registering light intensity. The scale associated with the meter is designed to eliminate one variable from those to be considered in determining the exposure to be given to a film, the scale or chart on the scale member being two dimensional, a series of exposure times being arranged in opposition to a series of stops or lens speeds. The position of the two sets of numerical values thus appearing on the scale are predetermined in accordance with known speeds of a particular type of film with which the particular scale or chart is to be employed. Thus, for each different speed of film I provide a separate scale member having a chart or scale designed to show the proper combinations of exposure time and lens speeds for any position which the pointer may occupy in response to the intensity of light to which the cell is exposed. Thus, the variable relating to light intensity is resolved into a known value by the position of the registering pointer or needle. The variable relating to the film speed is calculated in the design of the scale or chart and a direct and proper relationship of the two variables, exposure time and lens speed or stop (shown for example as f. numbers) are immediately and directly determinable by reading longitudinally of the scale in accordance with the position of the pointer and transversely of the scale in accordance with the selected exposure time or lens speed as the case may be.

I may utilize the simplicity of this arrangement in several ways. A preferred embodiment of the invention includes the use of a novel film package wherein, in addition to the film, there is included a scale member containing a chart or scale, the numerical values of which are placed on the scale or chart in accordance with the emulsion speed light value of the film with which the scale member is associated. Preferably the film, film package and chart bear means for readily associating the scale member and film after they have been removed from their common container. Thus, when the photographer purchases a package of film, he may remove the scale member, insert it in the exposure meter, load his camera with the film, and, when he is ready to expose the film, all that is necessary is to employ the exposure meter in a suitable manner to determine the light intensity of the object to be photographed and read directly from the position of the pointer the exposure time and stop which, with the particular film which he is employing, will result in proper exposure time and density of image.

The invention is not limited to use in the manner described above, however, as I may also provide a series of charts which may individually or in stacked relation be inserted in the exposure meter with the proper scale or chart exposed for the particular film being utilized, and the mechanism of employing the exposure meter is then identical with that described hereinabove.

I have illustrated certain embodiments of my invention in the accompanying drawings, wherein Fig. 1 shows in perspective one embodiment of an exposure meter, made in accordance with my invention, with the scale member removed;

Fig. 4 shows a film package, part of the outer container being broken away to illustrate the scale;

Fig. 6 is a plan view showing a modification of the exposure meter and scale arrangement;

Fig. 7 is a fragmentary transverse sectional view showing features of the modification of Fig. 6.

Figure 1:
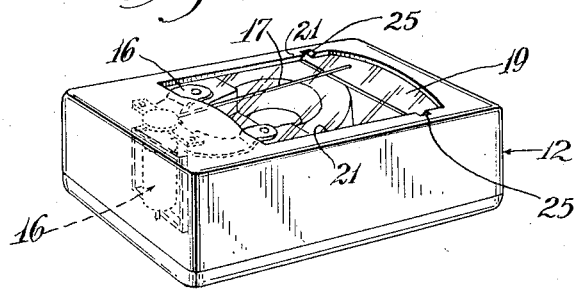
Figure 2:
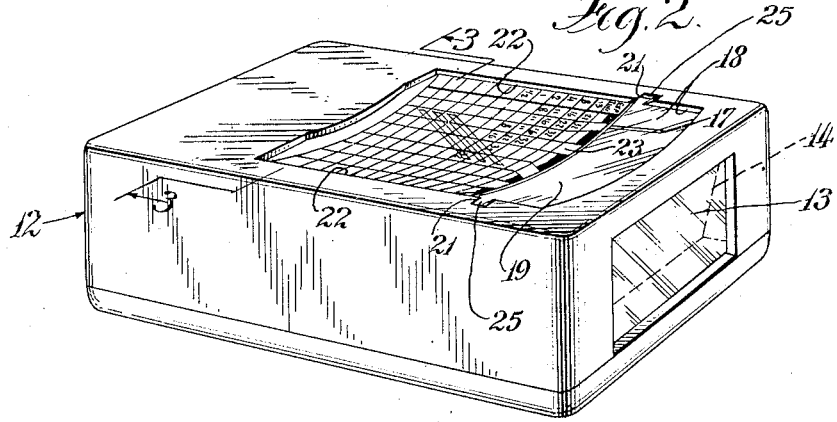
Fig. 2 shows the same instrument in perspective, but from a different angle and somewhat enlarged, and illustrates the scale member in position.
Figure 3:
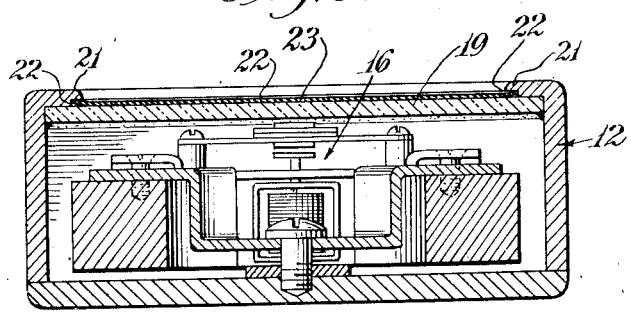
Fig. 3 is a section taken through the meter on the line 3—3 of Fig. 2.

Referring now first to Figs. 1 to 3, inclusive, I show an exposure meter having a housing 12, formed of Bakelite or other suitable material, with an aperture or window 13 for the admission of light to a suitable barrier layer cell 14. The current generated in the cell by the light striking against it operates a small meter, such as a galvanometer indicated generally by the reference character 16. Movement of the galvanometer is effective to control the position of a pointer 17 visible through a relatively large top aperture 18.

The top aperture of the housing is closed by a panel 19 suitably made of glass or other transparent material, and around the sides of the glass the top of the housing is provided with a bead 21 forming a recess 22, into which a scale member 23 is adapted to be inserted to be releasably held flat against the surface of the panel 19 with one rounded side thereof contiguous to the path followed by the pointer 17 when it is moved through operation of the galvanometer. The scale member covers the top aperture in the housing, except for a relatively narrow transverse portion through which the end of the pointer remains visible to cooperate with the scale. Angular slots 25 connecting with the recesses 22 are contiguous to the uncovered portion of the aperture, and provide means for the ready insertion of the scale members. While the angle of the slots 25 is such that the scale members will tend to be deflected upwardly when sliding movement is given to them (as with the thumb or fingers) in a direction to remove them, I find that turning the corners up slightly, as at 23a, not only promotes easy removal of the scale members, but also tends to hold them tighter in position by affording a slight friction against the top and bottom walls of recesses 22 when the scales are in operative position. Other friction means may, of course, be provided, but the form shown is satisfactory when thin metal, Celluloid or the like are used in the formation of the scale members.

Each scale member 23 is provided with a scale or chart which will be described more in detail in connection with Figs. 8 to 10, inclusive, but which chart is designed to show the proper exposure time and lens speed when a particular type of film is employed.

In Fig. 4 I illustrate a film package 24 containing a roll of film 26 and a scale member 23, this scale member being of such a size as to fit accurately in the exposure meter with which it is adapted to be associated after removal from the outer container in which it is housed. The numerical values contained on the scale forming a part of the scale member and their positions are calculated in accordance with the light speed emulsion value of the particular film with which the scale member is associated for greater ease in associating the film, film package and scale member after the film and scale member have been removed from the package, a common designating means is employed such, for example, as the two lines shown in the drawing running parallel but diagonally of the scale member and film package, a similar marking (not shown) appearing on the roll of film. These markings are suitably semi-transparent dashes of color through which the numerical values appearing on the scale member are easily read. To facilitate illustration, the scale member is shown merely set in the package with the scale facing outwardly through the broken-away portion. In actual practice, it should be packaged more suitably to associate it with the film.

In place of packaging the scale in the film package, I may provide a series of scale members 28 formed of Celluloid, molding composition, cellulosic derivative materials, thin light weight metal, paper, or the like, so as to occupy only a relatively small amount of space. I find that by putting a scale on each side of the scale member, I may, by the use of four scale members, provide a total of eight charts or scales which are ample in number to take care of all of the commonly employed films available on the market. By placing uppermost the scale or chart desired in accordance with the film used, the entire stack may be inserted in the exposure meter in the manner shown in Figs. 6 and 7 to be available at all times should the user wish to make a change in the type of film employed. These separate scales are preferably numbered, or lettered, or otherwise suitably designated, in order to identify films of various manufacturers with which each of the scales may be employed. I also preferably utilize quickly identifiable indicia described hereinabove in connection with Fig. 4, such, for example, as a line or series of lines of different colors running diagonally of the scale. This not only permits the user of the exposure meter readily to determine the particular scale which he is employing, but makes possible subsequent marking of film packages by any manufacturer interested in doing the same, to correspond with the markings on the charts of the scale members whereby to show more readily (for example, in case a new film should be put on the market) the scale member which is preferably employed with that particular film.

In the form show in Figs. 6 and 7, the ends of the recesses 22 may be left open as shown to facilitate insertion of the stack of scale members. I may, however, utilize the same general marking arrangement outlined in the preceding paragraph, and offer to the trade an exposure meter as illustrated in the main embodiment. For example, the scales may be vended separately, and the purchaser and user of the exposure meter may have only a single scale, i. e., the scale corresponding to the film which he habitually uses, or, if he prefers to change his film frequently, he may have a plurality of scale members which are conveniently housed in a small pocket or crypt in a small leather carrying case which is usually furnished with the exposure meter. Thus the exposure meter can be vended for employment with any films of any of the manufacturers whether the scale members be packaged with the films or not.

Figure 8:
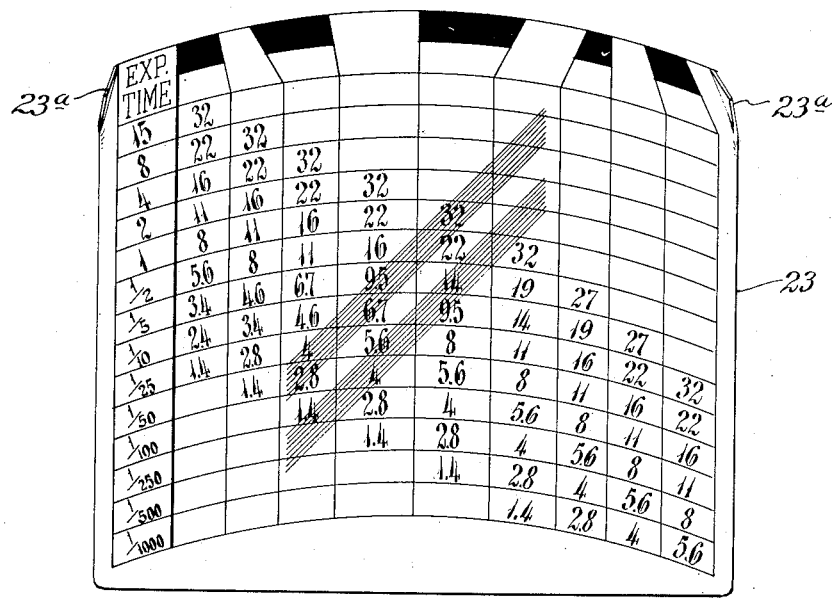
Figure 9:
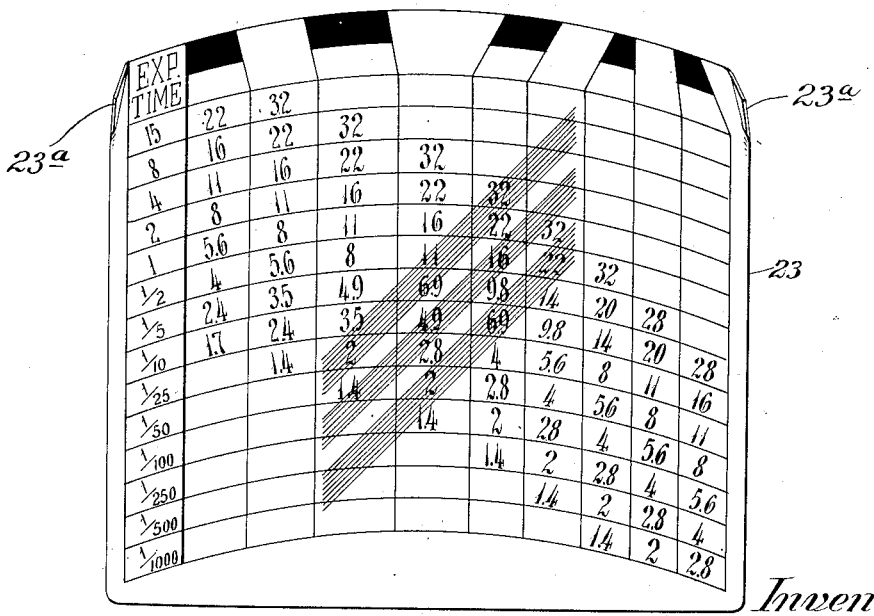

As an illustration of the arrangement of the scale members, I show, in Figs. 8 and 9, two scales adapted for use with two different types of films, that shown in Fig. 8 being a relatively sensitive film, usually identified as Plenachrome (#16), and that shown in Fig. 9 being an average Verichrome film usually identified at No. 6 so far as film speed is concerned. At the top of the scale I show divisions (which may be calibrated in foot candles) running transversely of the chart but longitudinally of the path of travel of the instrument pointer. These foot candle values may or may not be shown on the scale, since the actual light intensity need not be known in order to employ the chart for its intended purpose. At the left hand side of the chart, exposure speeds are shown running from fifteen seconds to one thousandth of a second, and, in a series of columns, generally in line with the divisions of the scales showing foot candles, lens speeds or stops (f. numbers) are shown with the slower lens values at the top and the higher lens values or bigger relative lens areas shown at the bottom of the columns. To employ the chart of Fig. 8, for example, we may assume that the pointer stops at a division of the scale corresponding to 16 foot candles, and that the photographer wishes to take a picture without the use of the tripod, for which he believes that he will have to use a shutter speed of at least $\frac{1}{5}$ of a second. He will then start at $\frac{1}{5}$ of a second and read over until the line running transversely from $\frac{1}{5}$ of a second (shown in the left hand column) crosses the vertical line corresponding to the position of the pointer. The photographer will then read at this point f. number 3.4, which shows him the stop which he must employ in order to get proper density of the film with an exposure of $\frac{1}{5}$ of a second. Let us assume, on the other hand, that he wishes to obtain suitable detail and decides that he wants to employ stop f. 8. He would read down from the position of the pointer to f. 8, then over to the left hand column, and find that under these circumstances he would have to expose the film for ½ a second and he would set his shutter accordingly. Under these circumstances he would decide, probably, to use a tripod.

Now looking at Fig. 9, and taking any selected light value, for example, 16 foot candles as in the previous case (the second division on the scale), it will be noted that the values in each case are different, than in the scale of Fig. 8. This would be expected because of the difference of the film speed. It appears unnecessary to make a detailed comparison for the purpose of illustrating the point.

It will be noted that a small proportion of the f. numbers appearing on the scales of Figs. 8 and 9 do not correspond exactly to the full f. number values used upon cameras and to denote lens speeds. For example, the f. number usually referred to is f. 3.5, in place of f. 3.4, as it appears to the right of the exposure time ⅕ in Fig. 8. Since the relationships established on the chart are not so direct that a uniform lineal dimension will lie between the position of each standard f. number on a scale, and there is, of course, an appreciable width to the columns themselves, the f. numbers represent the stop when the needle falls substantially along the center of the column, and accordingly, by noting whether or not the needle is to the left or to the right of the center, the photographer may make a correction in the camera setting so far as he believes necessary for the distance transversely between the position of the needle and the center of the column. Since, however, the well-known H & D curve shows that there is a considerable range in the total exposure which can be given to a film and still obtain satisfactory density, for the most part the user of the exposure meter may disregard the position of the pointer within the column and, for that matter, in constructing the scale I find that an average can be established which may be considered as slightly above or below the true value without deleteriously affecting the results secured. It may be noted also that, while I show in most cases the f. numbers usually found on camera scales for adjustment of the diaphragm or "stop," the photographer may use a setting between these specific numbers to make such adjustment as he believes necessary as determined by the position of the pointer and the position of the f. number, or to allow for the deviation between the standard f. numbers, and the f. number employed in a few cases to make the lineal dimensions of the chart correspond to the logarithm progression used in determining f. numbers.

Instead of employing f. number values lying between the usual standard f. numbers (as, for example, in the instance given the number f. 3.4 instead of the more customary f. 3.5), I may employ the standard f. numbers (or the generally corresponding numbers in the United States system) and place a dot or some other mark in the column to identify the point in the column where this value is indicated.

Figure 10:
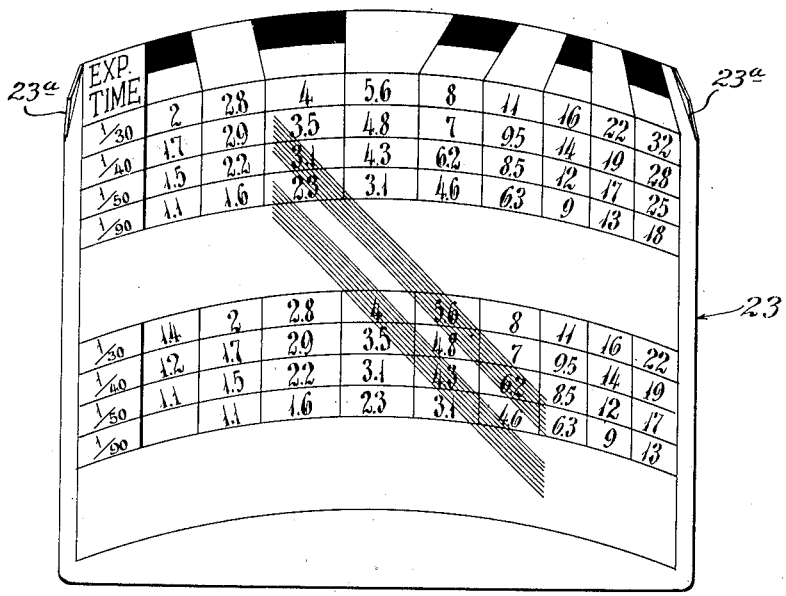
Figs. 8 to 10, inclusive, illustrate several forms of scale adaptable for use in my invention.
Figure 5:
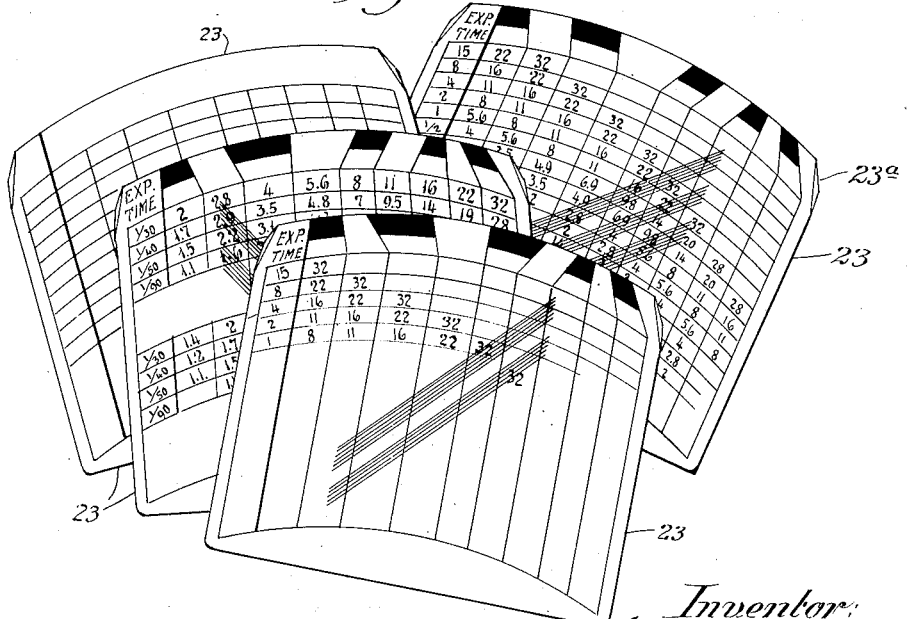
Fig. 5 shows a group of different scale members.

In Fig. 10, I illustrate scales suitable for use with motion picture cameras. The shutter speed is, of course, fixed in most motion picture cameras, and, in that case, the adjustment which the photographer makes is in the f. number or "stop." The two scales shown in Fig. 10 are for two different speeds of film, and, since the general characteristics are the same as the scales described, as shown in Figs. 8 and 9, it appears unnecessary to describe these two particular scales in detail.

I may, obviously, modify the scales so that the stops or lens speeds are indicated in columns lying on the outside of the path of the needle or pointer, and exposure times shown in the vertical columns in alignment with the path over which the pointer travels. The advantage of this arrangement is that I am able to show the f. numbers on one side and the U. S. numbers generally corresponding thereto on the other side. This scale, therefore, may be used by a photographer independent of the type of camera which he is using. The scale may be used in the same general manner as the scales heretofore described, the user reading down from the position of the pointer and across from the stop which he wishes to employ or across to the stop which he must employ if he is basing his selection on the shutter speed which he wishes to use.

From the description given above, it is obvious that I have been able to simplify the design and use of exposure meters while still obtaining adequate accuracy. In other words, in the simplification process, by virtue of which any one with a simple and short explanation may be able to use my exposure meter and obtain satisfactory results, the desired accuracy of the system has not been sacrificed. This is in part due to my improved means for calibrating the instrument, which in general may be described as follows:

In many exposure meters, it has been customary to adjust the sensitivity of the meter and cell combination, to give the proper deflection at only one point on the scale. Very often, this will result in poor tracking of the scale at other points, because any mechanical inaccuracies in the moving parts of the meter or relatively minor differences in the internal resistance of the barrier layer cell employed, may cause the reading of the meter to be quite a bit off the true or proper reading at points of the scale which have not been accurately calibrated.

I have found that, if I calibrate the meter at a relatively low light value, for example about 10% of full scale, with a resistance of approximately 4000 to 5000 ohms in the circuit including the cell and galvanometer coil, and then, by exposing the cell to a light value known to be that which should give, say, the full deflection, and changing the resistance until the needle falls on the point where the light admitted would indicate it should fall, the calibration at the lower value will remain substantially unchanged and the values between the lower calibrated point and full scale will be substantially correct, the margin of error being only very small. The meter may be calibrated at, for example, 10% of full scale by reducing the strength of the magnet by means of an alternating current field or in other ways. Such methods are known for adjusting the sensitivity of all types of D'Arsonval instruments. After the calibration at some low point on the scale has been effected, the value of the series resistance which was previously 4000 or 5000 ohms, for example, is adjusted to give the correct full scale reading at the required number of foot candles. This will still be in the neighborhood of 4000 or 5000 ohms, but the adjustment made at the higher reading has very little effect on the adjustment at the low end of the scale because the internal resistance of the cell itself is quite high at low values of illumination but relatively low at high values of illumination. As a consequence, a small change in external resistance in series with the cell at low values of illumination has little effect on the reading of the meter, but a small change, for example, a change of 100 ohms in a total value of approximately 5000 ohms, results in an appreciable change in the reading of the meter at high values of illumination.

By employing this method of calibration, I have found that the instrument itself will be made sufficiently accurate so that, considering the latitude in total light exposure, as shown by the well-known H & D curve, if the pointer falls within any one of the vertical columns, the relative values (determined from a consideration of the f. number lying in this column and associating any one of these f. numbers with the exposure time lying in the left hand column) will be sufficiently accurate so that good results will be obtained.

In employing the exposure meter of my invention, I may utilize any of the usual systems which photographers employ to determine the density of light. For example, I may expose the light sensitive cell to the entire area which will be photographed to get the average light density, or I may, for example, expose it only to the light reflected from a dark object which I wish to bring out in detail, or a bright object, if that is the main point of interest in the picture. It is well known, of course, that characteristics of background, the use of filters and other factors may make necessary some correction of the values derived from the use of the exposure meter, but all of these corrections may be made readily and to greater advantage when a direct and accurate reading is made possible, such as I provide in my improved arrangement.

What I claim as new and desire to protect by Letters Patent of the United States is:

1. In a photographic exposure meter, a housing having a light admitting opening, a pocket for receiving a scale member and holding the same in a flat, generally horizontal position, a scale member having a chart releasably supported in said pocket, a pointer adapted to move along one edge of said chart, means responsive to light entering said window for controlling the position of said pointer, said scale member being so constructed and arranged that any selected scale member corresponding to a given film speed may be readily slid into or out of said pocket, said chart being two dimensional and showing two variables to be read in relation to the position of the pointer and arranged to include calculation of a third variable corresponding to the speed of a film with which said scale is used, whereby a camera adjustment may be read directly from a single scale member readily selected to correspond to the film being used, and the selected scale may be quickly associated with the exposure meter by sliding the same into said pocket.

2. In a photographic exposure meter, a housing of generally rectilinear form having a side opening for admitting light, and a generally flat top portion, a continuous recessed flange extending substantially around three sides of said top portion, an opening being provided in said top portion at the unflanged side thereof, a pointer visible through said opening, means responsive to light entering said side opening for controlling the position of said pointer, and a scale member releasably held in recesses in said flanges and lying flat on said top portion with one edge thereof contiguous to said pointer opening, said scale member including indicia exposed when the scale member is associated with the exposure meter by being slid underneath said recessed flange for determining directly from the position of said pointer two variables with respect to the adjustment of a camera, the third variable being included by calculation within the figures given for the said two variables whereby an operator in the act of employing the exposure meter to determine the lens stop and exposure time will coincidentally include a calculation of the film speed.

3. An exposure meter as defined in claim 2, wherein recesses in said flange are sufficiently wide to receive a plurality of scale members in stacked relation, and a plurality of flat stacked scale members, one for each film speed and each bearing on at least one surface a two dimensional scale, and together including computations for substantially all common film speeds, the uppermost scale, when the scale members are supported in stacked relation, adapted for selective cooperation with said pointer to determine the exposure time at a determined lens speed when a given film is employed which has a speed the value of which is included in calculations comprising a part of the indicia appearing on said selected scale member.

4. In a photographic exposure meter, a housing having a light admitting window, and an aperture separate from said window, an indicating pointer visible through said aperture, means responsive to light entering said window for moving said pointer to a position in the aperture bearing a relation to the intensity of light entering said window, said housing having a raised portion surrounding said window and a recess around substantially three sides of the recess and communicating with the top surface by angular slots, and a plane scale member held in said recess and introducible through said slots, said scale member having a plurality of divisions corresponding to positions which the indicating pointer may assume for showing the relation between lens stops and shutter speeds, the figures for lens stops and shutter speeds being calculated in accordance with a particular film speed, whereby a separate scale member may be employed for each film speed and be readily insertable through said slots, and whereby, from the position of the pointer, lens stops and shutter speeds may be directly read without the use of the computer for the purpose of correcting for film speed.

5. The combination defined in claim 4, wherein said scale member is provided with a pair of upturned corners to facilitate its removal through said angular slots, said upturned corners engaging frictionally in the recesses in which the scale member is supported whereby to hold the scale member in firm but slidable relation with the housing while the exposure meter is being used.

6. The method of calibrating an exposure meter of the type employing a barrier layer cell and permanent magnet type of galvanometer in circuit, wherein a pointer is operated by the galvanometer along a scale to show light values and wherein said barrier layer cell is of a type having a relatively high internal resistance at low levels of illumination and relatively low internal resistance at high levels of illumination, which method of calibrating comprises exposing said cell to a known high level of illumination and introducing into said circuit an external resistance of approximate value to produce proper needle deflection at said high light value, demagnetizing the permanent magnet of said galvanometer sufficiently to cause said needle to show a proper deflection at a relatively low known value of illumination, and finally modifying said external resistance to give a fully accurate reading at a known high value of illumination.

7. The method of calibrating an exposure meter of the type employing a barrier layer cell and permanent magnet type of galvanometer in circuit, wherein a pointer is operated by the galvanometer along a scale to show light values and wherein said barrier layer cell is of a type having a relatively high internal resistance at low levels of illumination and relatively low internal resistance at high levels of illumination, which method of calibrating comprises initially introducing into said circuit an external resistance approximately equal to that which will result in proper needle deflection at high light values, demagnetizing the permanent magnet slightly to calibrate said meter at a relatively low known value of illumination, and finally modifying said external resistance to give an accurate reading at a known high value of illumination.

ARCHIE J. McMASTER.